(12) United States Patent
Sinha et al.

(10) Patent No.: US 12,517,084 B2
(45) Date of Patent: Jan. 6, 2026

(54) SELF DISINFECTING SENSOR AND METHOD OF OPERATION

(71) Applicant: 12-15 MOLECULAR DIAGNOSTICS, INC., East Haven, CT (US)

(72) Inventors: Saion K. Sinha, Fairfield, CT (US); Ewa Stanislawa Kirkor, Branford, CT (US)

(73) Assignee: 12-15 MOLECULAR DIAGNOSTICS, INC., East Haven, CT (US)

( * ) Notice: Subject to any disclaimer, the term of this patent is extended or adjusted under 35 U.S.C. 154(b) by 249 days.

(21) Appl. No.: 18/261,757

(22) PCT Filed: Jan. 20, 2022

(86) PCT No.: PCT/US2022/013073
§ 371 (c)(1),
(2) Date: Jul. 17, 2023

(87) PCT Pub. No.: WO2022/159553
PCT Pub. Date: Jul. 28, 2022

(65) Prior Publication Data
US 2024/0077452 A1      Mar. 7, 2024

Related U.S. Application Data

(60) Provisional application No. 63/139,590, filed on Jan. 20, 2021.

(51) Int. Cl.
*G01N 27/414*      (2006.01)
*A61L 2/04*        (2006.01)
*B82Y 30/00*       (2011.01)

(52) U.S. Cl.
CPC ............ *G01N 27/4146* (2013.01); *A61L 2/04* (2013.01); *B82Y 30/00* (2013.01)

(58) Field of Classification Search
None
See application file for complete search history.

(56) References Cited

U.S. PATENT DOCUMENTS 6,376,177 B1    4/2002   Poponin
6,824,974 B2    11/2004  Pisharody et al.
(Continued)

FOREIGN PATENT DOCUMENTS

JP    2008222765 A    9/2008
WO    2004020450 A1   3/2004
(Continued)

OTHER PUBLICATIONS

International Serarch Report and Written Opinion of International Application No. PCT/US22/13073, Filing Date Jan. 20, 2022, Mailing Date Apr. 6, 2022, 3 pages.
(Continued)

*Primary Examiner* — J. Christopher Ball
(74) *Attorney, Agent, or Firm* — CANTOR COLBURN LLP

(57) ABSTRACT

A life-form sensor and a method of detecting a life-form and disinfecting the sensor is provided. The sensor includes a matrix member made from a composite material having needle-like particles, electrically conductive platelets and a spacer material. A pair of electrodes are electrically coupled to opposing ends of the matrix. A heating device is arranged in thermal communication with the matrix member. A controller is operably coupled to the sensing device, the heating device, and the electrode, the controller being configured to receive a signal from the pair of electrodes and to polarize the matrix member and activate the heating device to a (Continued)

predetermined temperature range in response to placing a sample in the specimen container to simultaneously detect the presence of a target life-form and to disinfect the matrix member.

20 Claims, 13 Drawing Sheets

(56) References Cited

U.S. PATENT DOCUMENTS

| | | | |
|---|---|---|---|
| 6,958,216 | B2 | 10/2005 | Kelley et al. |
| 7,052,854 | B2 | 5/2006 | Melker et al. |
| 7,318,908 | B1 | 1/2008 | Dai |
| 7,635,423 | B2 | 12/2009 | Boussaad et al. |
| 8,154,093 | B2 | 4/2012 | Bradley et al. |
| 8,481,421 | B2 | 7/2013 | Goddard et al. |
| 9,919,922 | B2 | 3/2018 | Sinha et al. |
| 2001/0053535 | A1 | 12/2001 | Bashir et al. |
| 2002/0172963 | A1 | 11/2002 | Kelley et al. |
| 2003/0134410 | A1 | 7/2003 | Silva et al. |
| 2004/0104129 | A1 | 6/2004 | Gu |
| 2004/0106203 | A1 | 6/2004 | Stasiak et al. |
| 2004/0200734 | A1 | 10/2004 | Co et al. |
| 2005/0157445 | A1 | 7/2005 | Bradley et al. |
| 2007/0045756 | A1 | 3/2007 | Chang et al. |
| 2007/0134696 | A1 | 6/2007 | Zheng et al. |
| 2007/0158766 | A1 | 7/2007 | Lieber et al. |
| 2007/0172829 | A1 | 7/2007 | Exner |
| 2007/0212677 | A1 | 9/2007 | MacDonald et al. |
| 2007/0278111 | A1 | 12/2007 | Boussaad et al. |
| 2008/0004368 | A1 | 1/2008 | Wang et al. |
| 2008/0009002 | A1 | 1/2008 | Gruner et al. |
| 2008/0044651 | A1 | 2/2008 | Douglas |
| 2008/0131880 | A1 | 6/2008 | Bortolin et al. |
| 2012/0178187 | A1 | 7/2012 | Radtkey et al. |
| 2012/0178639 | A1 | 7/2012 | Sinha et al. |
| 2015/0008486 | A1 | 1/2015 | Bryant et al. |
| 2018/0105857 | A1 | 4/2018 | Pan et al. |
| 2020/0256826 | A1 | 8/2020 | Chen et al. |

FOREIGN PATENT DOCUMENTS

| | | |
|---|---|---|
| WO | 2005108612 A2 | 11/2005 |
| WO | 2006024023 A2 | 3/2006 |
| WO | 2006071895 A2 | 7/2006 |
| WO | 2007001401 A2 | 1/2007 |
| WO | 2008012728 A1 | 1/2008 |
| WO | 2008018834 A1 | 2/2008 |
| WO | 2008027078 A2 | 3/2008 |
| WO | 2008051316 A2 | 5/2008 |

OTHER PUBLICATIONS

Baker et al. "Covalently bonded adducts of DNA with single walled carbon nanotubes: Synthesis and hybridization" Nano Letetrs 2, 1413-1417, Oct. 15, 2002.

Guo, F., et al., "Short thio-multi-walled carbon nanotubes and Au nanoparticles enhanced electrochemical DNA biosensor for DNA hybridization detection" Proceedings of the SPIE, vol. 7749, (Jul. 2010) (abstract 2 pgs).

International Preliminary Report On Patentability of International Application No. PCT/US2022/013073, International Filing Date Jan. 20, 2023, Mailing Date Aug. 3, 2023, 6 pages.

Johnson et al. "probing the structure of DNA-Carbon nanotube Hybrids with molecular dynamics" Nano Lett. 8,1 (2008), p. 69, American Chem Society.

Johnson, R., et al., "A Label-Free, Electrochemical SERS-Based Assay for Detection of DNA Hybridization and Discrimination of Mutations" J. Am. Chem. Soc., 2012, 134 (34), pp. 14099-14107 Publication Date (Web): Jul. 26, 2012 (abstract 2 pgs).

Kalogianni, DP., et al., "Nanoparticle-based DNA biosensor for visual detection of genetically modified organisms" Biosens Bioelectron. Jan. 15, 2006;21(7):1069-76. Epub Jun. 2, 2005 (abstract 2 pgs).

Kell, Arnold J., et al., "The development of a silica nanoparticle-based label-free DNA biosensor" Nanoscale, The Royal Society of Chemistry, vol. 3, Issue 9, pp. 3747-3754 (Sep. 2011) (Abstract 3 pgs).

Keren et al. "DNA Templated carbon nanotube field effect transistor" Science 302, 1380-1382, Nov. 21, 2003.

Liu, G., et al., "Nanoparticle-Based Biosensors and Bioassays" Electrochemical Sensors, Biosensors and their Biomedical Applications Publisher Elsevier Inc. pp. 441-457 Number of pp. 17 ISBN (Print) 9780123737380Published—2008 (abstract 3 pgs).

Nadzirah, Sh., et al., "Titanium Dioxide Nanoparticle-Based Interdigitated Electrodes: A Novel Current to Voltage DNA Biosensor Recognizes *E. coli* O157:H7" PLoS ONE Published: Oct. 7, 2015 pp. 1-11.

Ölcer, Z., et al., "Microfluidics and nanoparticles based amperometric biosensor for the detection of cyanobacteria (*Planktothrix agardhii* NIVA-CYA 116) DNA" Elsevier Biosensors and Bioelectronics vol. 70, Aug. 15, 2015, pp. 426-432.

Pingarrón, José M., et al., "Gold nanoparticle-based electrochemical biosensors" Elsevier vol. 53, Issue 19, Aug. 1, 2008, pp. 5848-5866.

Thiruppathiraja, C., et al., "Specific detection of *Mycobacterium* sp. genomic DNA using dual labeled gold nanoparticle based electrochemical biosensor" Anal Biochem. Oct. 1, 2011;417(1):73-9. Epub May 27, 2011 (abstract 2 pgs).

Zelada-Guillen et al. "Imediate detection of living bacteria at ultralow concentrations using a carbon nanotube based potentiomatric aptasensor" Anges. Chem Int. Ed. 48, 7334-7337, 2009, wiley-VCH Verlag GmbH and Co. KGaA, Weinheim, Germany.

EP Search Report Issued Nov. 4, 2024 in MDX0003EP, 6 Pages.

SELF DISINFECTING SENSOR AND METHOD OF OPERATION

CROSS REFERENCE TO RELATED APPLICATIONS

This application is a US National Stage application of International Application PCT/US2022/013073, filed Jan. 20, 2022, which claims the benefit of U.S. Patent Application No. 63/139,590, filed on Jan. 20, 2021, both of which are incorporated by reference in their entireties herein.

BACKGROUND OF THE DISCLOSURE

The subject matter disclosed herein relates to a sensor, and in particular to a sensor for detecting a target life-form that can simultaneously detect the presence of a target life-form and self-disinfect the sensor.

The term biohazard refers to any biological materials (microorganisms, plants, animals, or their byproducts) that pose a threat to health. In a subset of decontamination procedures, sterilization, not synonymous with disinfection, is understood as a process that destroys all microorganisms (microbial species herein defined as a collective including bacteria, and/or fungi, and/or viruses) on the surface of an article, or in a fluid to prevent disease transmission associated with the use of that item. According to Center of Disease Control most medical and surgical devices used in healthcare facilities undergo primarily heated steam sterilization. However, since 1950, there has been an increase in medical devices and instruments made of materials (e.g., electronics, plastics) that require different means of disinfection. Consequently, the disinfection requirement, as used herein, is understood that the treatment is sufficient to prevent infection or disease transmission associated with the use of that item.

Various forms of materials, especially silver have known antimicrobial applications since ancient times. However the current covid 19 pandemic and prospects of future threats of similar nature make it desirable to enhance the antimicrobial protection by use of properties of common and relatively inexpensive materials especially in applications requiring handling of infectious materials or protecting from potential contamination.

Carbon is one of most common and durable elements on Earth. Carbon inks show a desired level of durability in documents and drawings that persist for thousands years. Its graphenic elemental forms (graphite, or nanographite, graphene or various carbon nanotubes) are not typically significantly harmful to microbial species. Antibacterial activities of graphene derivatives are imparted by chemical modifications or metal and metal-oxide composite nanostructures. Graphene or graphite alone are rather benign toward the microbial species, herein defined as a collective including bacteria, and/or fungi, and/or viruses.

Among the mechanisms of action of carbon nanotubes (CNT) on microbial cells through direct contact results in a disruption of the cell wall and cytoplasmic membrane, changes in membrane fluidity, oxidative stress, enzyme inhibition, and reduced transcription of several key genes. It has been shown that the antimicrobial effect of CNTs strongly depends on their diameter, length, aggregation degree, concentration, surface functionalization, degree of purification, and especially time of contact. Needle-like objects, such as carbon nanotubes exhibit antimicrobial activity under ambient conditions, but only slowly taking several hours or longer to have partial effect. Usual preparatory methodology for these various materials involves many steps rendering it difficult and expensive.

It should be appreciated that it is desired that any user and any persons assisting with the use of the sensing device are protected from harmful contamination that may come from the specimen under test. It is assumed that if the specimen under test is still capable of life activities such as metabolic activity such specimen and object in contact with the specimen is treated as a biohazard.

Conventional disinfection methods are normally applied to the typical currently employed biosensing devices before reuse. However, these conventional devices and treatment methods are not generally effective for in-situ decontamination as are the here disclosed certain combinations of materials, heat and electrical current employed for example in certain devices for the detection and inactivation of cellular life forms and viruses and especially for the in-situ sterilization, inactivation, decontamination or disinfection of components. Alternate methods are either damaging to the devices or the devices comprise complex arrangements which are expensive and difficult to manufacture.

Accordingly, while existing life-form sensors are suitable for their intended purposes the need for improvement remains, particularly in providing a sensor having the features described herein.

BRIEF DESCRIPTION OF THE DISCLOSURE

According to one aspect of the disclosure a life-form sensor is provided. The sensor includes a matrix member made from a composite material, the composite material including needle-like particles, electrically conductive platelets and a spacer material. A pair of electrodes are electrically coupled to opposing ends of the matrix. A heating device is arranged in thermal communication with the matrix member. A controller is operably coupled to the sensing device, the heating device, and the electrode, the controller being configured to receive a signal from the pair of electrodes and to polarize the matrix member and activate the heating device to a predetermined temperature range in response to placing a sample in the specimen container to simultaneously detect the presence of a target life-form and to disinfect the matrix member.

In addition to one or more of the features described herein, or as an alternative, further embodiments of the sensor may include the needle-like particles being electrically conductive. In addition to one or more of the features described herein, or as an alternative, further embodiments of the sensor may include the needle-like particles being the carbon nanotubes. In addition to one or more of the features described herein, or as an alternative, further embodiments of the sensor may include the multiple-wall carbon nanotubes being 6 to 12 walled carbon nanotubes.

In addition to one or more of the features described herein, or as an alternative, further embodiments of the sensor may include the electrically conductive platelets being configured to provide a percolation pathway between the needle-like particles and the pair of electrodes. In addition to one or more of the features described herein, or as an alternative, further embodiments of the sensor may include the electrically conductive platelets being selected from a group comprising: nanographite platelets, nanographite-like platelets of plain or composite semiconductive materials, metalized glasses and metallized polymeric materials with platelet-like form factors.

In addition to one or more of the features described herein, or as an alternative, further embodiments of the sensor may include the predetermined temperature range being between 55 C and 75 C. In addition to one or more of the features described herein, or as an alternative, further embodiments of the sensor may include the predetermined temperature range being between 58 C and 68 C.

In addition to one or more of the features described herein, or as an alternative, further embodiments of the sensor may include the polarizing of the matrix member causes the applying of a 1V to 5V potential differential. In addition to one or more of the features described herein, or as an alternative, further embodiments of the sensor may include the polarizing of the matrix member causes the applying of a 2V to 3V potential drop.

In addition to one or more of the features described herein, or as an alternative, further embodiments of the sensor may include a support layer coupled to a side of the matrix member.

In addition to one or more of the features described herein, or as an alternative, further embodiments of the sensor may include the spacer material having a porosity of up to about 30 microns. In addition to one or more of the features described herein, or as an alternative, further embodiments of the sensor may include the spacer material being made from a material selected from a group comprising: paper, woven fabric, knit fabric, non-woven fabric, and an open pore sponge.

According to another aspect of the disclosure a method of detecting and disinfecting a target life-form on a sensor is provided. The method includes placing a sample material in a sample container, the sample container including a matrix member made from a composite material that includes needle-like particles, electrically conductive platelets and a spacer material. A cellular membrane is perforated of at least a portion of the sample material. The sample material is heated to a predetermined temperature range. The sample material is polarized. The presence of a predetermined target life-forms is determined in response to the heating and polarizing of the sample material. The matrix member is disinfected based at least in part on the heating and polarizing of the sample material.

In addition to one or more of the features described herein, or as an alternative, further embodiments of the method may include heating a temperature of the sample material to a predetermined set point prior to polarizing the matrix member.

In addition to one or more of the features described herein, or as an alternative, further embodiments of the method may include mixing a sample material with pure water in the sample container.

In addition to one or more of the features described herein, or as an alternative, further embodiments of the method may include the electrical conductive platelets providing a percolation pathway between the needle-like particles and the pair of electrodes.

In addition to one or more of the features described herein, or as an alternative, further embodiments of the method may include the predetermined temperature range is between 55 C and 75 C. In addition to one or more of the features described herein, or as an alternative, further embodiments of the method may include the predetermined temperature range being between 58 C and 68 C.

In addition to one or more of the features described herein, or as an alternative, further embodiments of the method may include the polarizing of the matrix member includes applying a 1V to 5V potential differential.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

Figure 1:
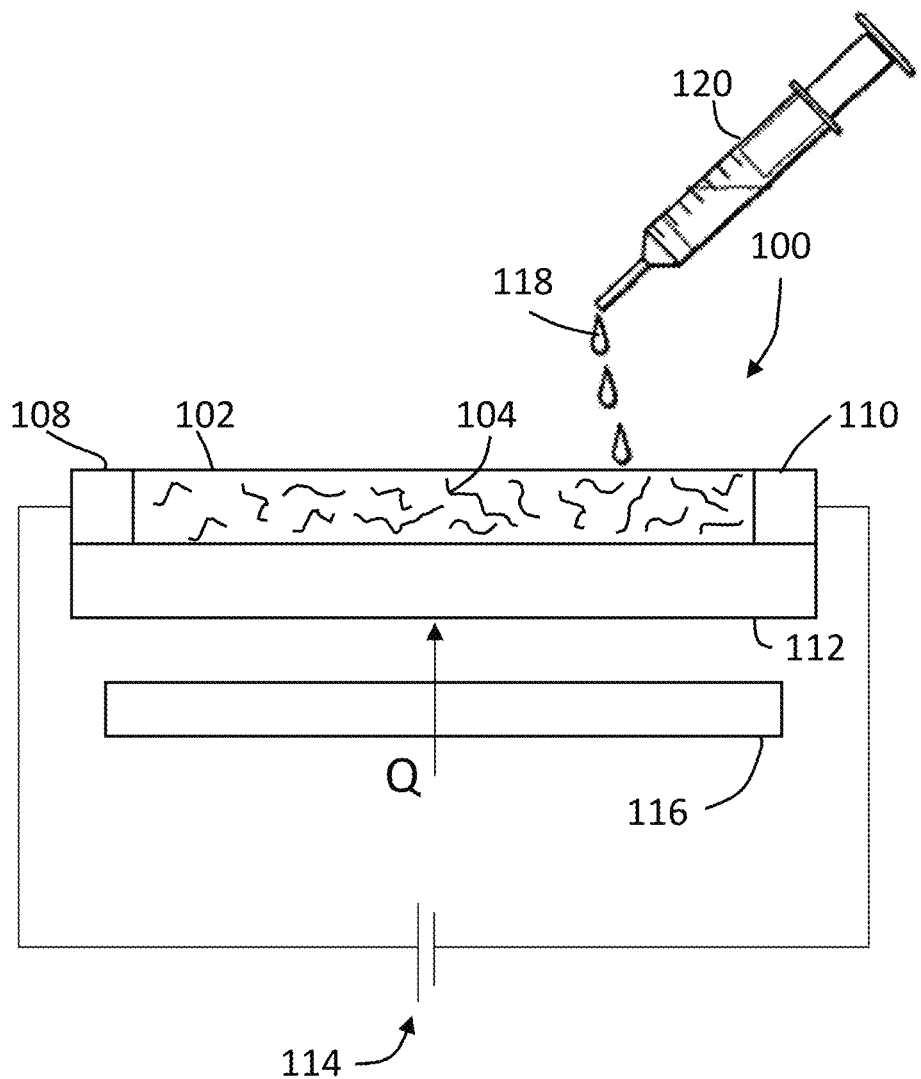
FIG. 1 is a schematic diagram of a self-disinfecting sensor for detecting a target life-form in accordance with an embodiment.

The detailed description explains embodiments of the disclosure, together with advantages and features, by way of example with reference to the drawings.

DETAILED DESCRIPTION OF THE DISCLOSURE

Embodiments of the present disclosure provide for sensing device that is also providing a self-disinfecting feature.

Generally, decontamination can be achieved independently with heating an object. However, it can also prevent the detection of target life-forms or possibly damage the sensing device. For example, a minimal disinfecting heat treatment uses boiling in water for no less than 15 minutes. Typical sterilizing conditions use autoclaves and steam for upwards of 30 minutes and temperatures of about 100 Celsius or higher.

It has been found that the combination of the electrical polarization with heating of sensing spots of the sensing material while providing a temperature set point for each of the sensing spots allows for the concurrent detection of the target species and decontamination of the specimen and the sensing material.

In an embodiment, the duration of the disinfection process is limited by the duration of the sensing process. The sensing process typically takes less than twenty minutes, and in other embodiment less than an hour. In an embodiment, the heating time while performing the sensing/detecting operations were about 10 minutes. In still further embodiments, the specimens were in contact with the heated polarized sensor. For a yeast sample, deactivation of the target life-form was performed in less than 5 minutes. In an embodiment, the decontamination objective can be achieved within this constraint by subjecting the sensing material to temperature below certain limit and to electrical polarization within certain limits set forth by the constraints of the sensing process. In an embodiment, the temperatures limit is between 55 C to 75 C. The sensing material alone or electrical polarization alone or temperature alone that are used to provide conditions for the detection of the target life-forms within the time and chemistry constraints of the sensing process are not sufficient to cause disinfection. It has been found that the combination of these three factors elicits the disinfection. The exemplary sensing process for nucleotide sequences uses an application of a temperature below the melting point of the hybrids to be formed during the sensing process. This condition sets a high limit for the temperature that can be used for decontamination of the sensor device shown in FIG. 1.

In an embodiment, two electrodes are provided that contact the sensing transducing layer containing a needle-like or a thin tubular electrically conductive component capable of perforating cellular membrane and the provided combination of electrical potential and heat. The needle-like component is embedded in a matrix. The matrix is an also electrically conductive material exhibiting similarity of physical and chemical properties to the needle form, but with the main purpose of being a carrier and support for the needlelike material and electrical conductor for the transducer in the sensing function.

In an embodiment, combinations of sensing transducing layer (i.e the matrix) materials consisting of a needle-like electrically conductive component and an embedding electrically-conducting matrix component (electrically conductive platelets), an electrical potential in a range from 0.5 to 5 V applies and the sample is heated to a temperature from ambient temperature up to 76 degrees Celsius. In an embodiment, the sample may be heated to a temperature between 55 degrees Celsius and 75 degrees Celsius. This enables the opening of cellular membranes and viral coatings at a sufficiently fast rate to detect target life forms and also decontaminate the specimen during the period of time used to acquire data sufficient for detecting target species among the released nucleic acids, DNA and/or RNA thus enabling detection of target organisms in clinical samples such as bodily fluids and especially saliva.

Additionally, in an embodiment, it is believed that the disinfection process after the detection process can be augmented by polarizing the sensing component to 5 Volts and setting the arrangement temperature to 75° C. for 5 to 10 minutes, which should still allow for detection of the target life-form and disinfection within 20 minutes. It should be appreciated that some hybrids may break down or "melt" at elevated temperatures such as 75 C, which may result in an unfavorable shift in the hybridization equilibrium, which may interfere with detection. To accommodate this, it is believed that rather than operate at a temperature that interferes with detection (e.g. 75 C), the detecting may be performed at a lower temperature and the disinfecting function may augmented after the detection process is finished to complete the disinfection process.

In an embodiment, the disinfecting transducing material comprises combination of graphite particles from 5 to 95% by weight and carbon nanotubes from 5 to 95% by weight. The balance of the material can be filled by another suitable electrically conducting or semiconducting material. In an embodiment, the balance of the material can be filled by amending additives such as binders or porosity regulators that are not electrically conductive provided that the sensor itself remains electrically conductive. In an embodiment, the transducing material may be supported by a support layer. The support layer may be made from a material such, but not limited to, polymeric, ceramic, aerogel foams, textiles, paper, and glassy materials for example.

In another embodiment for the disinfecting, the transducing material (i.e. the matrix) comprises combination of graphite particles from 40% to 85% by weight and carbon nanotubes from 60% to 15% by weight, the balance of other materials consists of other graphenic forms of carbon particles, such as carbon nanotube, or fullerene or graphene or graphite partial oxidation, hydration or hydrogenation products, or forms including nitrogen, oxygen or sulfur or some zero-valent metals such as copper, iron, manganese, zinc or other metals or zero-valent metal nanoparticles with a lower electrochemical potential than silver embedded in the carbon or organic material lattices, such as for instance but not limiting to cyclic ligands such as crown ethers, porphyrins or phthalocyanines or pentacenes, or else carbonyls or cyanides or the like for example.

It should be appreciated that certain fungi, such as yeast for example, are known to cause, for instance, oral infections. An experimental test was performed for the deactivation of yeast. In this experimental test the fungal pathogen is represented by baker's yeast, a relatively innocuous strain, otherwise known as sacharomyces cerevisae, a fungus used for preparation of bakery products, but whose overgrowth can cause gastrointestinal discomfort on occasion. The use of the sensor of FIG. 1 results in deactivation of yeast in sucrose solution which occurs within 20 minutes of a typical detection period with an electrical potential of 1 to 3 volts at temperature of a set point of 60 degrees Celsius. After the disinfection of the specimen, yeast samples of up to 100,000 cells per sensing spot that were subject to the disinfection conditions show no metabolic or growth activity in a sucrose supplemented culture for up to 8 days after the treatment. It is believed that, a loading of a million target life forms or more per sensing spot can be decontaminated. The control samples subject to the contact with the sensing material alone were inactive for up to 3 days in such culture, but after a 3 days in culture some samples exhibited metabolic activity evidenced by production of carbon dioxide. Positive control samples were all metabolically active over the full observation period. Negative control samples which were not inoculated with the yeast were metabolically inactive throughout the observation period. Heat alone at 60 C does not inactivate all of the introduced cells. It was observed that only the specific combination of heat and electrical potential disinfected yeast specimens, the surrounding fluid and the immersed device component. The calibration of the detection enables to ascertain the number concentration of target organisms and prevent from exceeding the population that can be reliably disinfected. Specimen overload is detectable and instruction provide the user with a supplemental disinfection method.

Additional examples include detection and deactivation of bacteria such as *E. coli, salmonella* and *Borrelia Burgdorferi* that are detectable with the sensor of FIG. 1 under these conditions of time, heat and electrical potential as well as viruses such as corona viruses, including COVID 19 and PRRS, porcine respiratory and reproductive syndrome virus in saliva, serum or process fluid obtainable in pig farming during processing of piglets.

More examples include *E. coli* in produce such as leafy green plants, such as lettuce and spinach, and berries, such as strawberries.

It is believed that bacteria and viruses may be deactivated under the above conditions in other fluids from other sources of the occasion of molecular genetic testing for nucleic acids, RNA and DNA and their combinations, such as complementary DNA and RNA, RNA and RNA, DNA and DNA for example, with use of combination of heat and electrical polarization. The deactivation temperature set point is above from the temperature of optimal metabolic activity or propagation of the species. The combination of thermal and electrical treatment enables pore opening and transport of nucleic acids out of enclosures enabling their metabolic or multiplicative functions.

Advantages of the sensor disclosed herein include, but are not limited to inactivation and disinfection of specimens containing nucleic acids or proteins or other signatures of potential for life either independent or in symbiotic or parasitic association with another life form.

In another embodiment, the transducing material comprises a gas permeable open pore structure. One advantage of such an arrangement is that it is scalable, adaptive and can be configured to any form and shape thereby allowing new applications, e.g. as a gas filter, a functional fabric and the like that can be electrically polarized and heated under mild conditions nevertheless permitting biohazard decontamination so that it is useful for biohazard monitoring, fluid such as water or air purification, and pollution (exhaust or effluent) control.

Experimental test for the disinfection of the sensing component of the sensor involves exposing the sensor to the yeast, Sacharomyces cerevisae and subjected to the sensing conditions common to detection of Covid 19 from saliva without aforementioned augmentation. The yeast were cultivated in suspensions at 10 to 30° C., and the biosensor transducing layers comprising of 10% to 40% of multiple-walled carbon nanotubes and 60% to 90% of nanographite platelets, the particles with length in range from submicron's to multiple tens of micrometers on a porous support were inoculated with no less than 10,000 cells/microliter, that is 50,000 cells per transducing spot equipped with electrodes (graphite or a metal such as gold, copper or the like, but not silver which in itself can be antimicrobial, but interferes with the sensing function of the transducer). The sensing spot with electrical resistance in range from 0.5 kilo ohm to 3.5 kilo ohm was subjected to the voltage within operating limits of the instrument (here −5V to +5V functional range of the instrument electronics). A voltage provided in a range from 1 to 5 volts and temperature elevated above ambient to the detection temperature set-point allows for the detection of many bacterial or viral species. This is within the limits determined by the needs for specificity of detection for the target of hybridization reaction, 57° C. to 60° C. in 24 replicates of the test, and 8 replicates of each control experiment. Control experiments involved water, 5 to 10% sucrose solution, transducing material inoculated with the yeast at the same level, but not subjected to electrical polarization or elevated temperature.

All materials were cultured for 24 hours before the viability test. The result of this test was that all 24 samples of the sensing component exposed to no less than 50,000 yeast cells and the voltage and temperature conditions described above showed no indications of viability neither immediately after, not after 24 hours in culture, or after 3 days of culture; neither did the samples of water, or plain sucrose used in this experiment. Correspondingly all samples of yeast cultured in sucrose were viable and metabolically active. The 75% of the negative control samples consisting of the sensing material bearing component inoculated with yeast in sucrose culture viable and they were metabolically active a day after the exposure to the sensing material, but without application of the sensing conditions. These samples continued metabolic activity on day 3 and day 7 after set-up.

It should be further noted that the sensing device is not restricted to embodiments comprising just two electrodes and one sensing spot and may include multiplexing electrodes and sensing spots. It should be appreciated that the electrochemical arrangements of the electrodes may be scalable from macro to nanoscale while still functioning in both detection and disinfection. Further, the electrodes may be shaped as radio frequency identification (RFID) tags that would allow for a noncontact transmission of sensing signals. In still further embodiments the specificity of the radio frequency (RF) signal attenuation or frequency change as the detection method.

Figure 5:
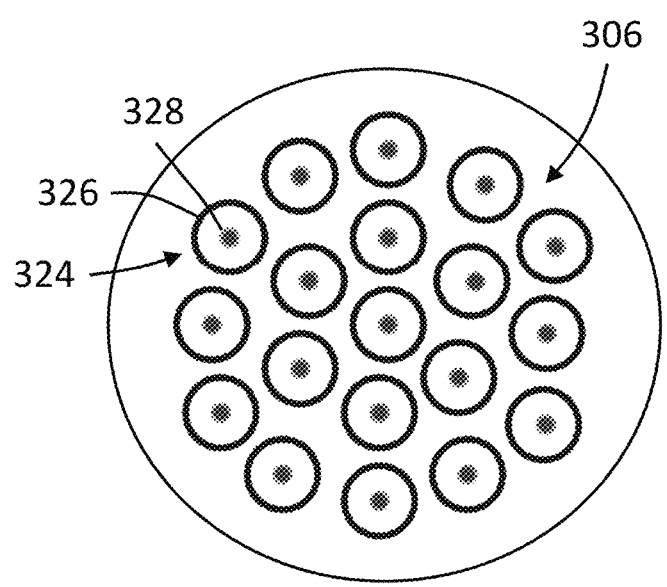
FIG. 5 is a schematic illustration of a concentric electrode array for the sensing system of FIG. 4 in accordance with an embodiment.

In an embodiment, the sensing device shown in FIG. 5 is shaped as a tube of the sensing material with tubular external electrode and cylindrical internal electrode, arranged in a similar manner to a coaxial cable. The material separating the electrodes is the sensing material the external electrode is perforated so that it can admit reagents and the specimen to the surface of the sensing material. Such nonlimiting arrangement is permitting the change of the detection method from direct current to radiofrequency detection and additional multiplexing of the detectable target life forms and viruses and also permitting for sensing in an immersion configuration.

It should further be noted that the entire sensing arrangement can be flat, two-dimensional, planar and/or curved. In other words, the sensing device according to embodiments provided herein can easily be adapted to any desirable shape without deviating from the teachings provided herein In an embodiment, the sensing arrangement is substantially two-dimensional, flat and deformable so that the shape of the entire electrode arrangement can be adapted to the contour of a part which is to be attached or treated. Such an arrangement allows the use of shapes in wearable electronics and sensing applications for example.

In another embodiment, the sensing and disinfecting arrangement further comprises a cover which is covering the arrangement. The cover can be adapted to contain the species of interest and limit thermal loses thereby reducing the time needed for a decontamination. Further, the cover can be adapted to filter out decontaminated materials. It is further possible to adapt the cover to effect a better control of the sensing, for instance by screening adventitious electromagnetic interferences. Finally, the cover can be adapted so that the arrangement can operate under reduced or increased pressure.

It should further be noted that the embodiments provided herein are not restricted to a sensor as a single component.

In another embodiment of the invention, the sensing device is adapted to clean air from pollutants, particularly bacteria, viruses or spores. In one embodiment, the sensing arrangement is permeable to gas and while the polluted gas passes through the sensing arrangement target pollutants are detected and inactivated during the residence in the sensing compartment.

In another variant of this embodiment, the sensor arrangement is tube-shaped and the polluted air axially passes through the arrangement so that the arrangement cleans the air from the pollutants while the polluted air passes through the arrangement.

It should further be mentioned that the sensing device may be portable or hand-held. Further, in some embodiments, the sensing device includes an integrated electrical battery for powering the sensing device.

As an example, the novel approach to disinfection can also be used for the treatment of a mycosis.

In an embodiment, the sensing device may be a fluid filter, particularly an air filter, comprising a mesh of the sensing spots and corresponding electrode pattern as mentioned herein for covering a filtration surface of an air purification device. In a nonlimiting embodiment, the integration of a sensing material with the electrode pattern into a filter allows a combination treatment involving the specified materials, electrical polarization and temperature without limitations imposed by the hybridization sensing.

Figure 2A:
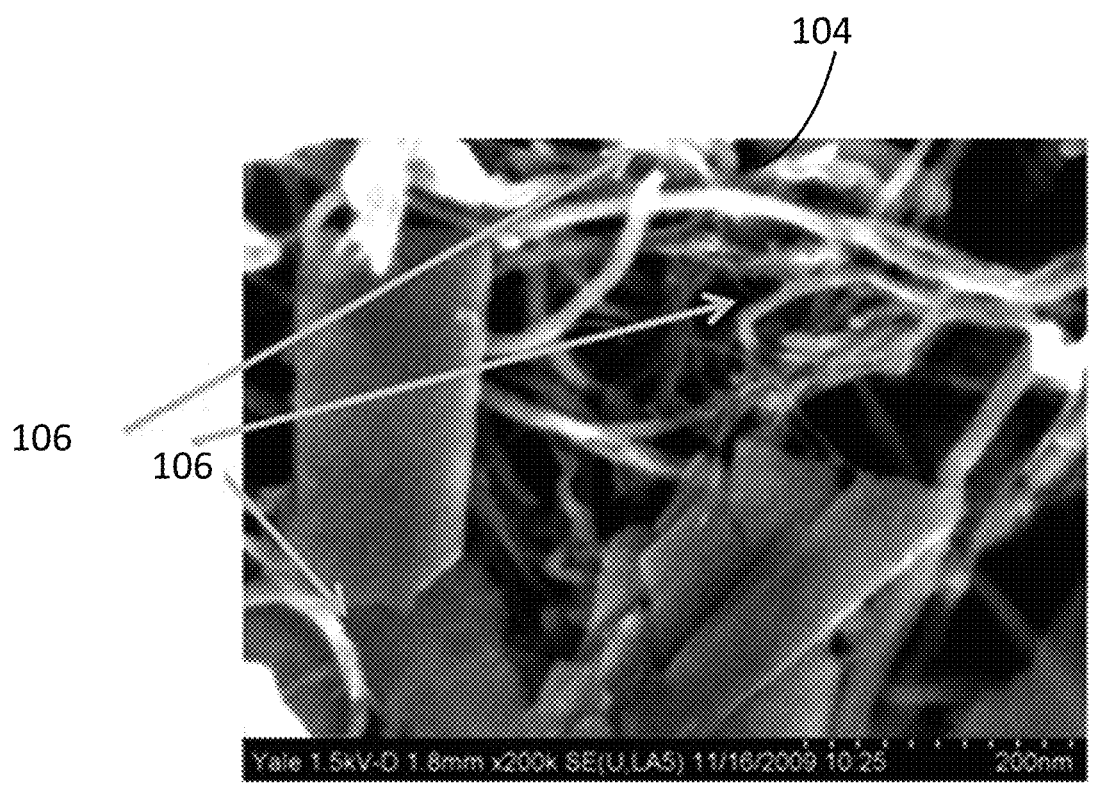
FIG. 2A is an electron microscopy image of carbon nanotubes used in the matrix of the sensor of FIG. 1 or FIG. 2 in accordance with an embodiment.

Referring now to FIG. 1, an embodiment is shown of a sensor device 100. The sensor device 100 includes a matrix 102 that is made from a composite comprised of a plurality of needle-like particles 104, an electrically conductive platelets, and a spacer material. A portion of the composite material is shown in the electron microscopy image of FIG. 2A. At least a portion of the needle-like particles 104 have sharp ends 106. In the exemplary embodiment, the needle-like particles 104 are carbon nanotubes. In an embodiment, the carbon nanotubes are multiple-walled carbon nanotubes. In still another embodiment, the carbon nanotubes include 6 to 12 walls. In other embodiments, the needle-like particles are either stiff fibrils or nanowires.

The electrically conductive platelets provide a percolation pathway from the needle-like particles to electrodes 108, 110. In an embodiment, the electrically conductive platelets may be nanographite platelets, other conductive platelets, metalized glasses, or polymeric materials. The spacer material provides a porosity to the matrix. In an embodiment, the platelets may include thermometric carbon composite containing nan-graphite platelets and MWCNT in a predetermined ratio. This provides benefits for the sensing matrix in: 1) regulating thermal conductivity of the matrix (dynamic, temperature dependent property); and (2). exhibits specific semiconducting properties enabling quality control in production of the sensors. In an embodiment, the porosity is about 10 micron. The porosity is selected to be compatible with the dimensions of the carriers of the genetic materials, targets of detection (target-life-form), and pathogens that may be present in the specimen being tested. In an embodiment, the matrix 102 is between 5 to 100 microns thick.

Figure 2B:
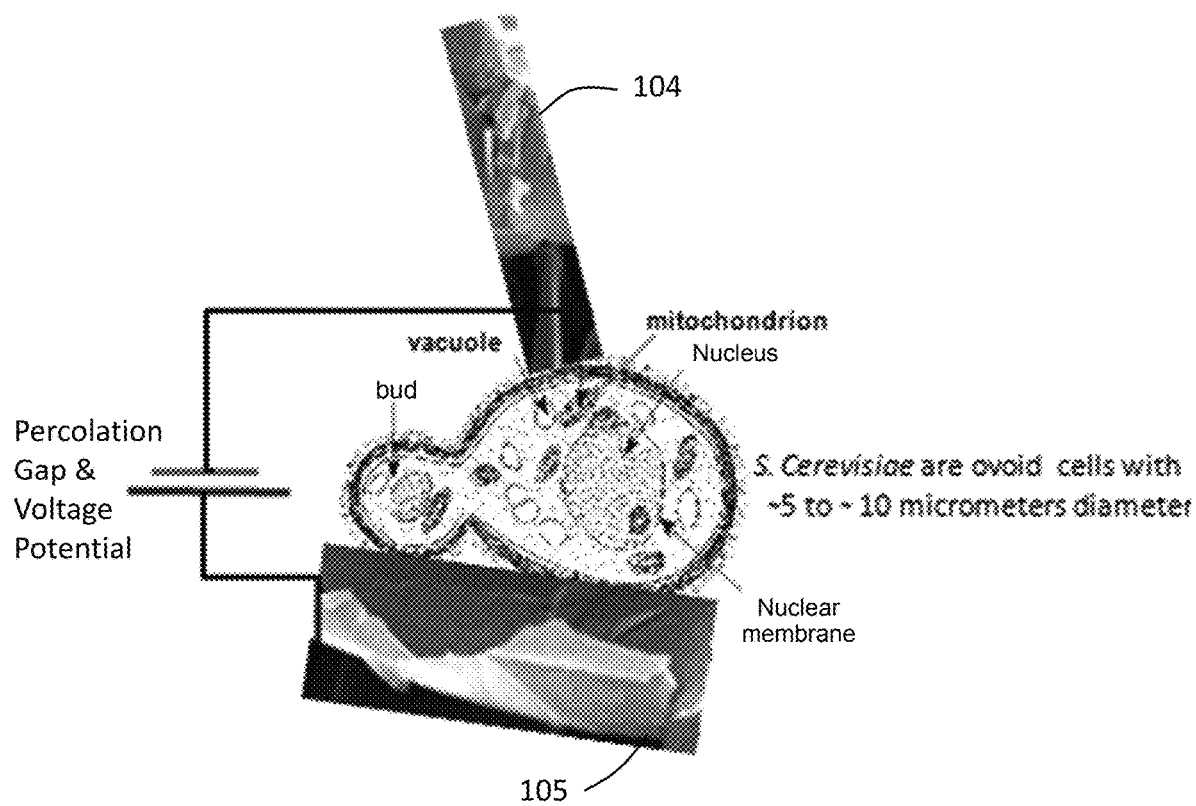
FIG. 2B is a schematic illustration of an interaction between a cell, a needle-like particle and a platelet in accordance with an embodiment.
Figure 3:
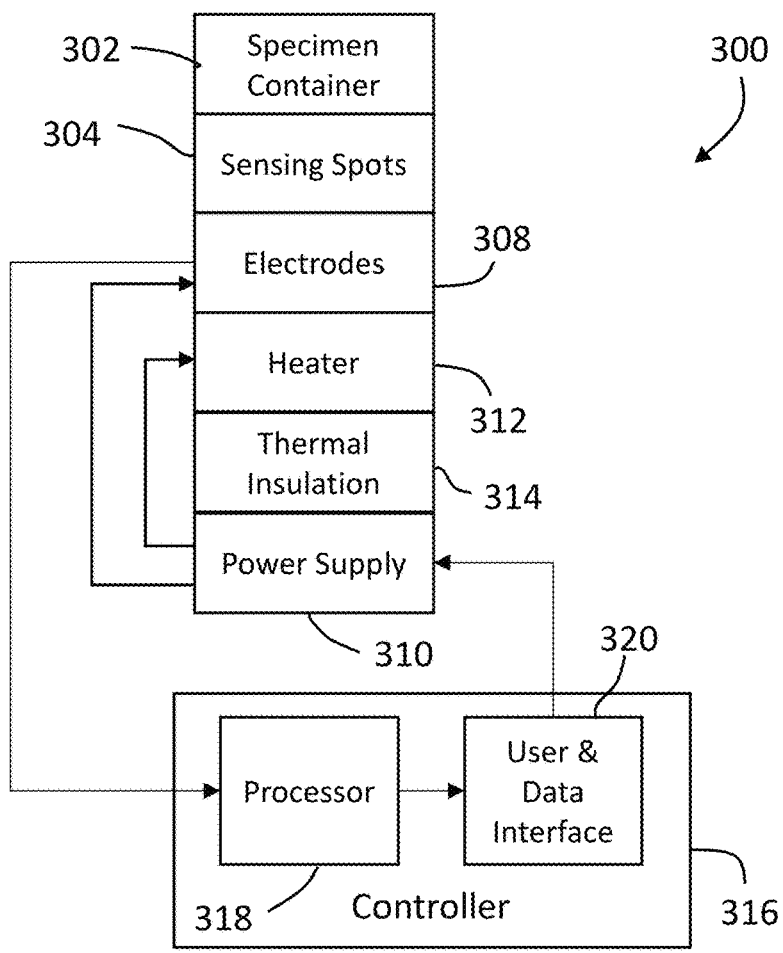
FIG. 3 is a schematic illustration of a self-disinfecting sensing system for detecting a target life-form in accordance with an embodiment.

Referring to FIG. 2B shows an interaction between the needle-like particles 104, the electrically conductive platelets 105 and a cell, such as *S. Cerevisiae*. In some embodiments provided herein, the sensor allows for the electrical polarization and differentiation of electrical signals categorized as the native conduction of the sensing matrix, the signal from primed with the target c-DNA matrix, and the signal where the c-DNA reacted with the target nucleic acid. The target nucleic acid appears only after the membrane containing the target genetic material was breached, and the genetic material was released from its compartment in a virion or a cell.

The matrix 102 is attached to (or deposited on) a support layer 112 that acts as a carrier for the matrix 102. In an embodiment, the support layer is made from a porous material, such as paper or fabric. The material may be knit, woven, non-woven, an open pore sponge, or a combination of the foregoing. The support layer 112 is selected to provide a porosity that is on the order of the cellular dimensions/size of the target life form. In other embodiments, the support layer 112 may be rigid and the spacer material provides the desired level of porosity.

The matrix 102 may be primed with an ssDNA of the target life-form as is known in the art.

Attached to the matrix 102 are a pair of electrodes 108, 110. In an embodiment, the electrodes 108, 110 are attached to opposite ends of the matrix 102 as shown in FIG. 1. In other embodiments, the electrodes 108, 110 may be like those shown in FIG. 5 where the first electrode is concentrically disposed about a second electrode with the matrix material disposed therebetween. It should be appreciated that these electrode/matrix configurations are for example purposes and the claims should not be so limited.

Attached to the electrodes 108, 110 is a power supply 114 that applies an electrical potential to the electrodes 108, 110 and hence the matrix 102. As discussed herein, the power supply 114 also allows for the polarization of the matrix 102 to facilitate disinfection of the sensor device 100.

The sensing device 100 further includes a heat source 116 that is in thermal communication with the matrix 102. It should be appreciated that the flow of thermal energy Q from the heat source 116 to the matrix 102 may be via conduction, convection, radiant, or a combination thereof.

The embodiment of FIG. 1 illustrates the sample 118 being tested as being dispensed by a pipette or a syringe 120. However, this is for example purposes and the claims should not be so limited. In other embodiments, the sensor device(s) may be arranged in a specimen container such as a cup (FIG. 4) for example. In still further embodiments, the sensor device 102 may be arranged to receive a fluid, such as air for example, that flows through the matrix 102.

Referring now to FIG. 3, an embodiment is shown of a sensing system 300 is shown. In this embodiment, a specimen container 302 is provided, which could be in the form of a specimen cup 302, such as that shown in FIG. 4 for example. The system 300 further includes sensing spots 304 that are arranged to receive the sample to be tested. Each of the sensing spots 304 includes a matrix, such as matrix 102 for example. In an embodiment, the sensing system 300 includes a plurality of sensing spots 304 arranged in an array 306 (FIG. 4, FIG. 5). It should be appreciated that providing an array of sensing spots 304 provides advantages in redundancy, and allowing for the detection of multiple target-life-forms in the sample being tested.

Electrically coupled to the sensing spots 304 are electrodes 308 that are electrically coupled to a power supply 310. In an embodiment, the each of the sensing spots 304 (i.e. the matrix), electrodes 308, and power supply 310 are configured in the same manner as the sensor device 100. A heat source 312 provides thermal energy to the sensing spots 304 to heat the sample being tested. In an embodiment, a thermal insulation layer 314 is disposed adjacent the heat source 312.

A controller 316 is provided having one or more processors 318 and user and data interface 320. The one or more processors 318 are responsive to executable computer instructions for carrying out operational methods to operate the sensing system 300, such as the methods described herein for example. It should be appreciated that that controller 316 may have further components (e.g. volatile and non-volatile memory) and circuits (e.g. communication circuits) as is known in the art.

In operation, the user deposits a sample to be tested in the specimen container, placing the sample in contact with the sensing spots 304 (e.g. the matrix). The user initiates operation, such as through the user and data interface 320 for example, and the power supply 310 is activated by the controller 316. The power supply 310 provides electrical power to the heater 312 which results in the increase in temperature of the sample being tested to a predetermined temperature range. Further, the power supply provides electrical power to the electrodes 308 to polarize the sensing spots 304 to a desired level. The electrodes 308 provide a signal back to the one or more processors 318 to determine the presence of the target life-form. The system 300 is run for a predetermined amount of time to allow for the simultaneous detection of the target life-form and disinfection of the specimen container 302, the sensing spots 304 and the electrodes 308.

Figure 4:
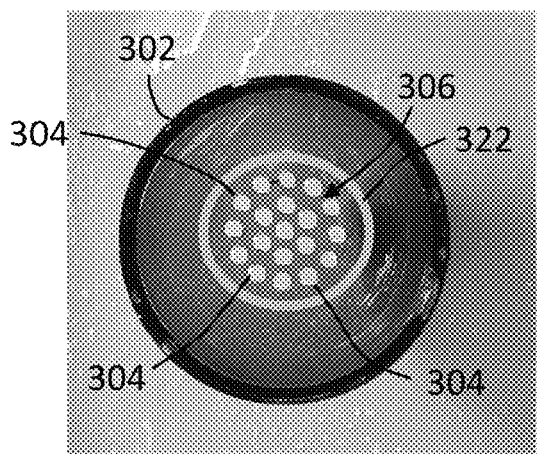
FIG. 4 is a top view of a self-disinfecting sensing system for detecting target life-form in accordance with an embodiment.

Referring now to FIG. 4, an embodiment of the system 300 is shown where the sample container 302 is in the form of a cup or dish. Disposed within the sample container 302 is an array 306 of sensing spots 304. In an embodiment, each of the sensing spots 304 includes a matrix and a pair of electrodes, as is shown in FIG. 1. In an embodiment, sufficient amounts of the sample to be tested is provided to fill the area within circle 322.

As discussed herein, the sensing spots 324 may be in the form of a concentric electrode 326 that is disposed about a central electrode 328. In the embodiment of FIG. 5, the sensing spots 326 are arranged in an array 306 that allows for 19 sensing spots and the detecting of five (5) different target life-forms in triplicate.

Figure 6:
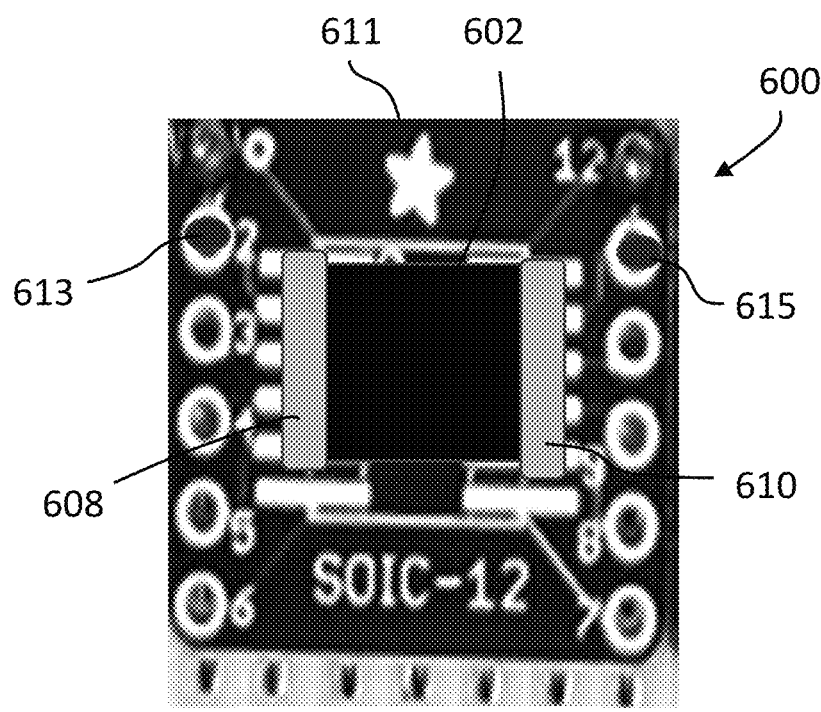
FIG. 6 is a schematic illustration of another sensor device in accordance with an embodiment.

FIG. 6 illustrates an sensing system 600 that includes a matrix 602 that is supported by a support layer made from blotting paper. The matrix 602 may be the same as matrix 102 described herein. A pair of electrodes 608, 610 are electrically connected on opposite ends of the matrix 602. In this embodiment, the matrix 602 and electrodes 608, 610 are arranged on a printed circuit board 611 that connects the electrodes with electrical contacts 613, 615. The contacts 613, 616 allow the printed circuit board 611 to be connected to a controller, such as controller 316 for example.

Figure 7:
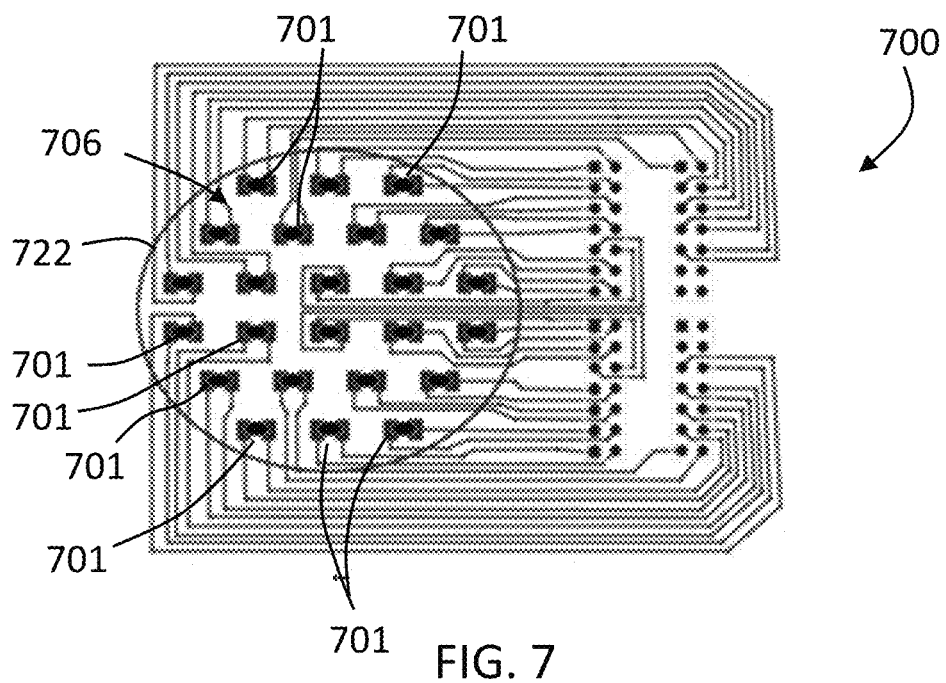
FIG. 7 is a schematic illustration of another sensor device having an array of sensors in accordance with an embodiment.
Figure 8:
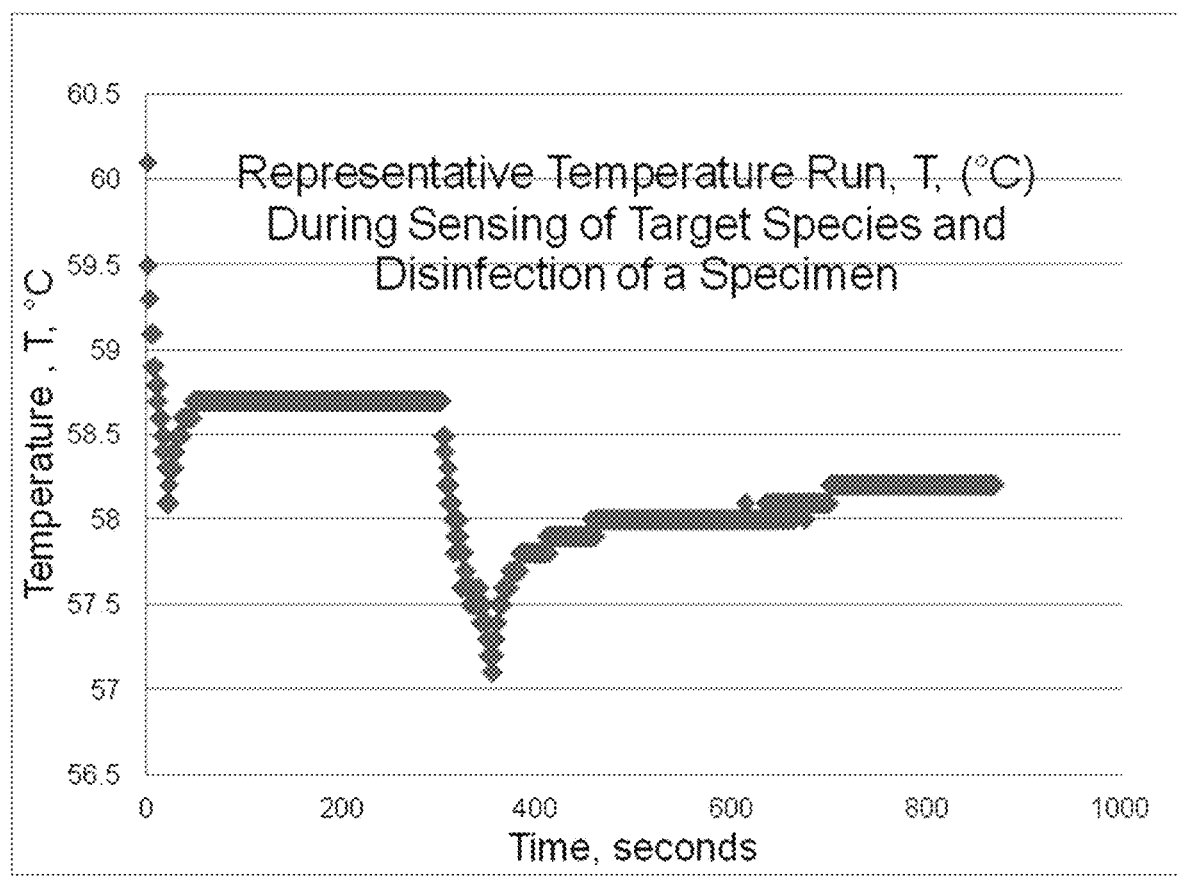
FIG. 8 is a plot of temperature versus time for the sensing and disinfection of a specimen in accordance with an embodiment.

. FIG. 7 illustrates another sensing system 700 having a plurality of sensor devices 722 arranged in an array 706. Each of the sensor devices 701 include a matrix and a pair of electrodes, such as the matrix 102 and electrodes 108, 110 for example. In an embodiment, the sensor devices 701 are disposed within a wall 705 that contains the sample being tested to the area where the sensor devices 701 are located. Each of the sensing devices 701 are connected by a pair of conductors 705 to electrically connect the electrodes to pin feedthroughs that connect with a controller, such as controller 316 for example Referring now to FIG. 8, an example plot is shown of an example temperature profile that may be used during the detection of the target life-form and the disinfection of the sample being tested and the sensor device.

Figure 9:
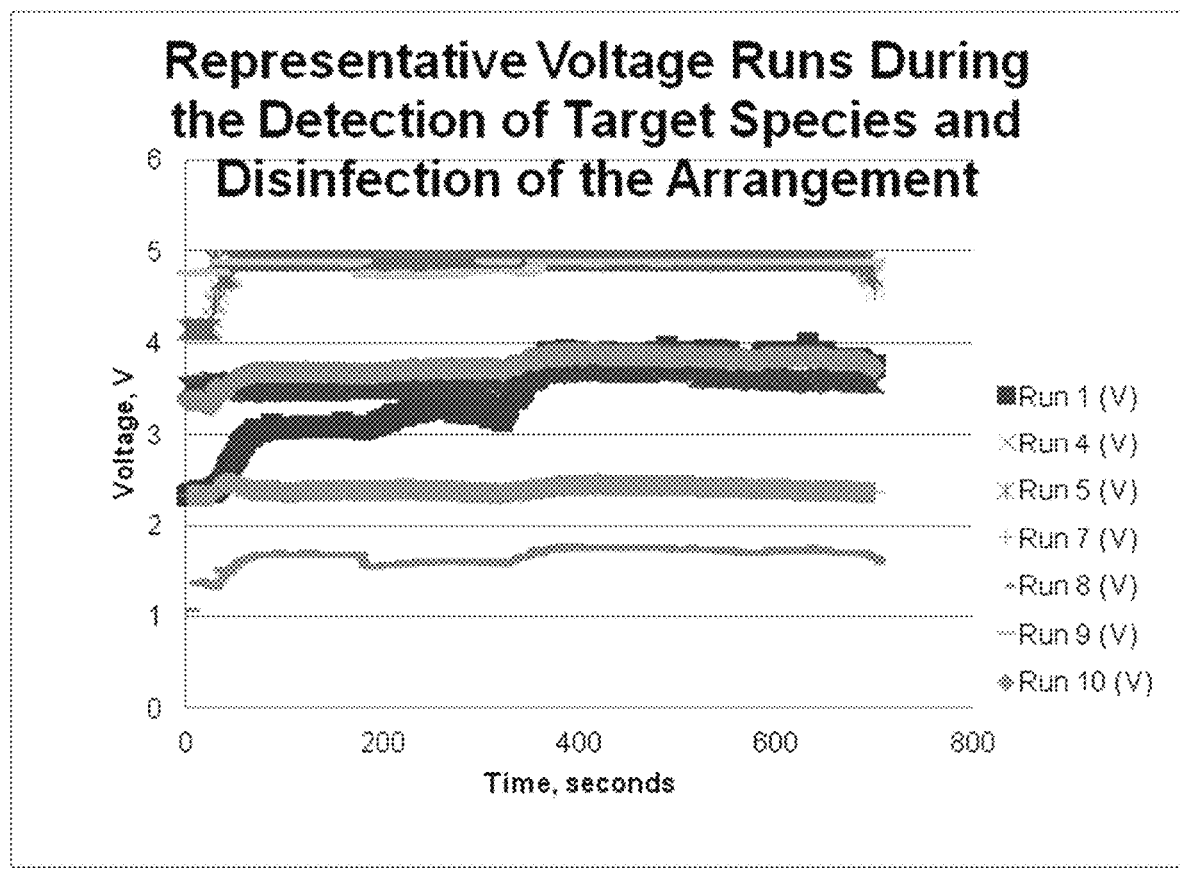
FIG. 9 is a plot of voltage versus time for the sensing and disinfection of a specimen in accordance with an embodiment.

FIG. 9 illustrates another example plot of a voltage profile during the detection of target life-forms, bacteria, viruses, fungi, or other life-forms and the disinfection of the sensor device.

Figure 10:
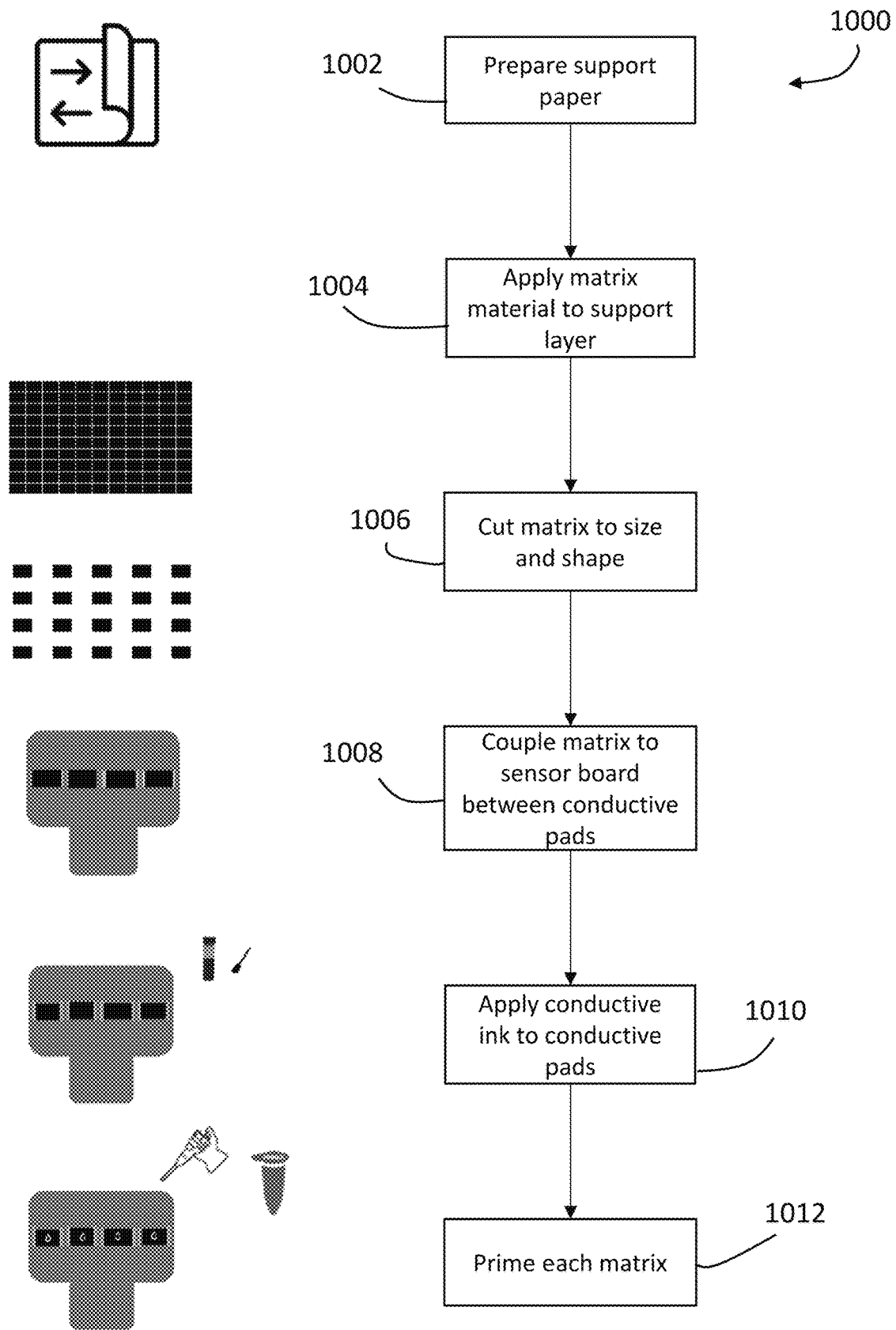
FIG. 10 is a flow diagram for fabricating a sensor device in accordance with an embodiment.

Referring now to FIG. 10, an embodiment is shown for a method 1000 of fabricating the sensor device. It should be appreciated that this method is an example, and the sensor device may be fabricated in other manners and in different configurations. The method 1000 begins in block 1002 where the support layer is prepared by applying a layer of adhesive film to filter paper. The method 1000 then proceeds to block 1004 where the matrix material is coated onto the filter paper. The matrix material being the same as is described with respect to matrix 102. In an embodiment, the matrix material is applied using a doctor blade. The matrix material is then left to dry at 86° F. (30 C) and 18% humidity for at least 15 hours.

The method then proceed to block 1006 where the matrix is cut into a desired size and shape. For example, the matrix may be rectangular for use in a sensor device like that shown in FIG. 1 (e.g. 8 mm×6 mm). The method 1000 then proceeds to block 1008 where the matrix is coupled to a sensor board having at least one pair of conductive pads. In an embodiment, the adhesive film is used to couple the matrix to the sensor board. The matrix is coupled to the sensor board so that it is disposed between a pair of conductive pads. A conductive ink is then applied in block 1010 to the conductive pads at each matrix member. In an embodiment, the conductive ink may be dried at room temperature and 20% humidity for at least 15 hours. It should be appreciated that the humidity level and drying time may be changed without affecting the self-disinfecting functionality of the sensor. Finally, in block 1012, each of the matrix members are primed with a primer concentration and allowed to absorb into the matrix member.

Referring now to FIG. 11A-11D a sequence of assembly steps is shown for assembling the sensor board into a sensor assembly that is used in a sensor system. The sensor assembly 1100 starts in FIG. 11A with a housing 1101 having a plurality of threaded inserts 1102 and a plurality of openings 1104. An o-ring 1105 or other suitable seal is disposed about the openings 1104. The sensor board 1106 is then placed on the housing 1101 with the matrix members 1108 placed over and against the openings 1104. In an embodiment, the threaded inserts 1102 align the sensor board 1106 to the housing via holes in the sensor board 1106. Fasteners, such as screws 1110, may then be used to couple the sensor board 1106 to the housing 1101 via the threaded inserts 1102. In the illustrated embodiment, each of the matrix members 1108 are electrically coupled to terminals 1111 via the conductive pads and a conductive trace.

Figure 11A:
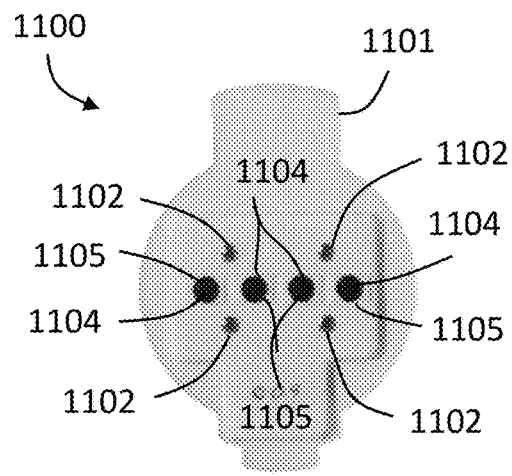
FIG. 11A-FIG. 11D illustrate an assembling of a sensor assembly in accordance with an embodiment.
Figure 11B:
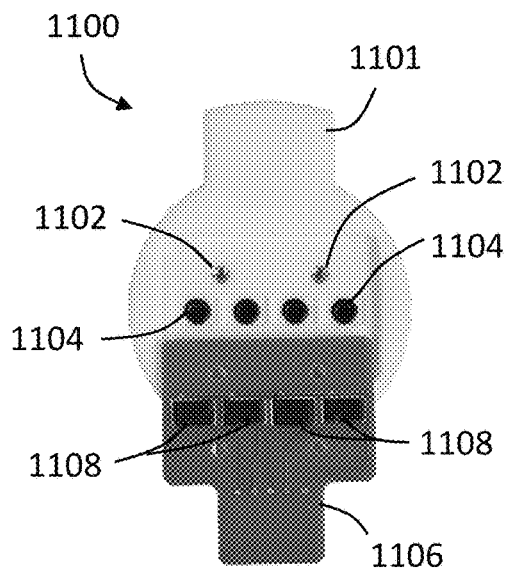
Figure 11C:
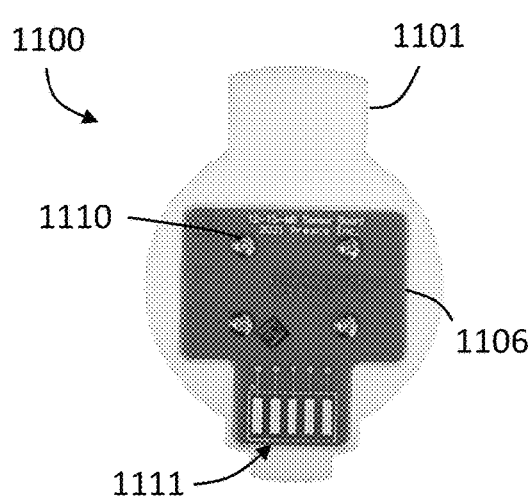
Figure 11D:
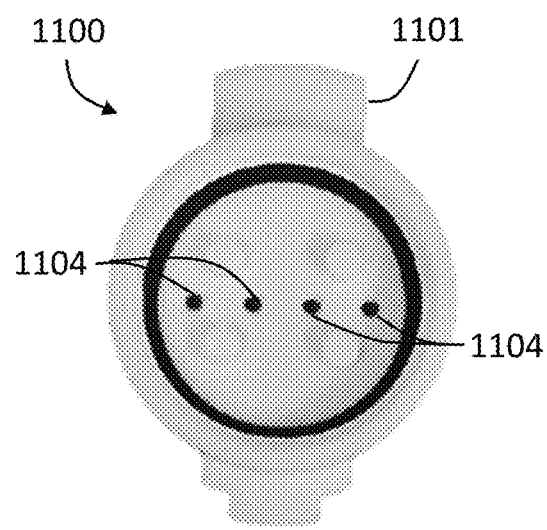
Figure 12A:
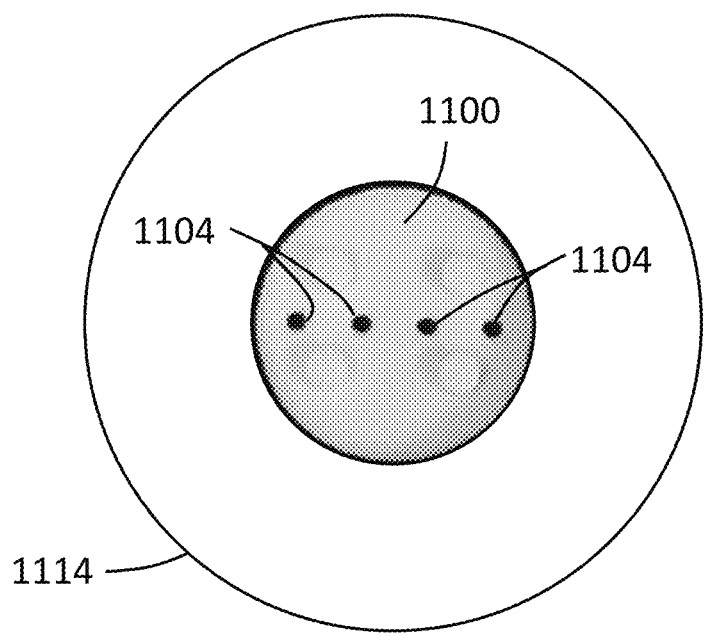
FIG. 12A-FIG. 12D illustrate a preparation and testing of a sample material in accordance with an embodiment.
Figure 12B:
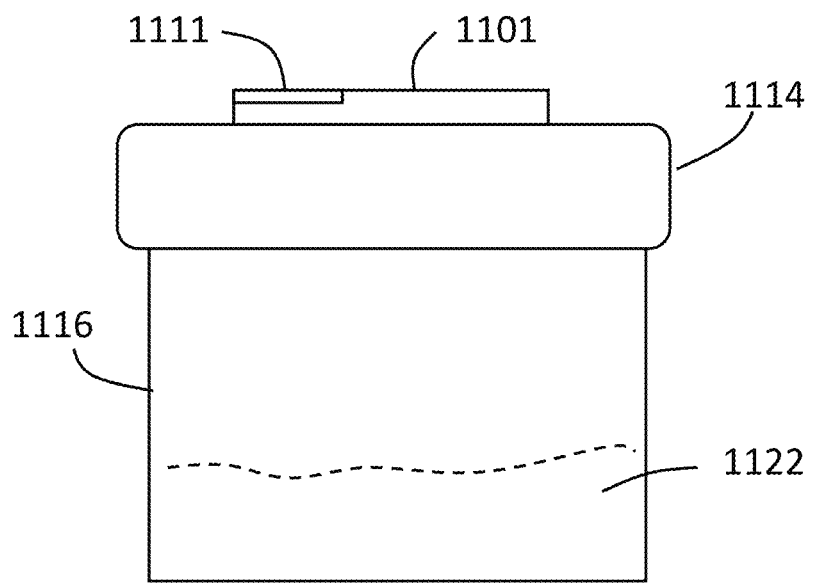

It should be appreciated that the matrix members 1108 are sealed against the openings 1104 by the o-rings 1105. The openings extend through the housing 1101 to the opposite side (FIG. 11D). In an embodiment, an o-ring 1112 is disposed about the openings 1104 to seal the sensor assembly 1100 to a cover 1114 of a sample container 1116 (FIG. 12A, FIG. 12B). The cover 1114 has a central opening that allows the openings 1104 to be exposed to the interior of the sample container 1116 when the cover 1114 is installed thereon.

To use the sensing system 1120 (FIG. 12D), the user first inserts or places a sample material into the interior of the sample container 1116. In an embodiment, a sample of 1-3 milliliters of a sample such as saliva is sufficient for testing. The operator then adds about 30 milliliters of pure water to the sample container 1116 to form a sample and water mixture 1122. The cover 1114 is coupled onto the sample container 1116 to enclose the mixture 1122 (FIG. 12B) and the mixture 1112 is swirled for a predetermined number of times (e.g. 5 to 7 times) to complete the mixing of the contents.

Figure 12C:
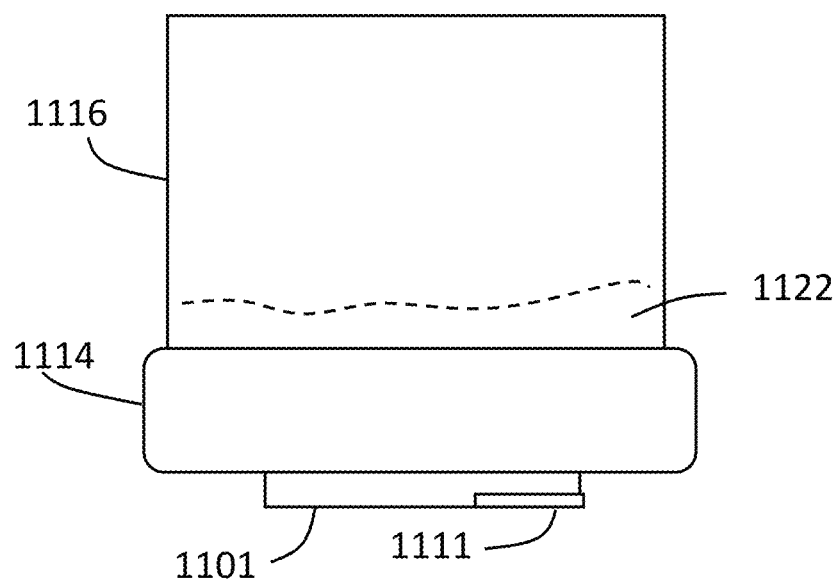
Figure 12D:
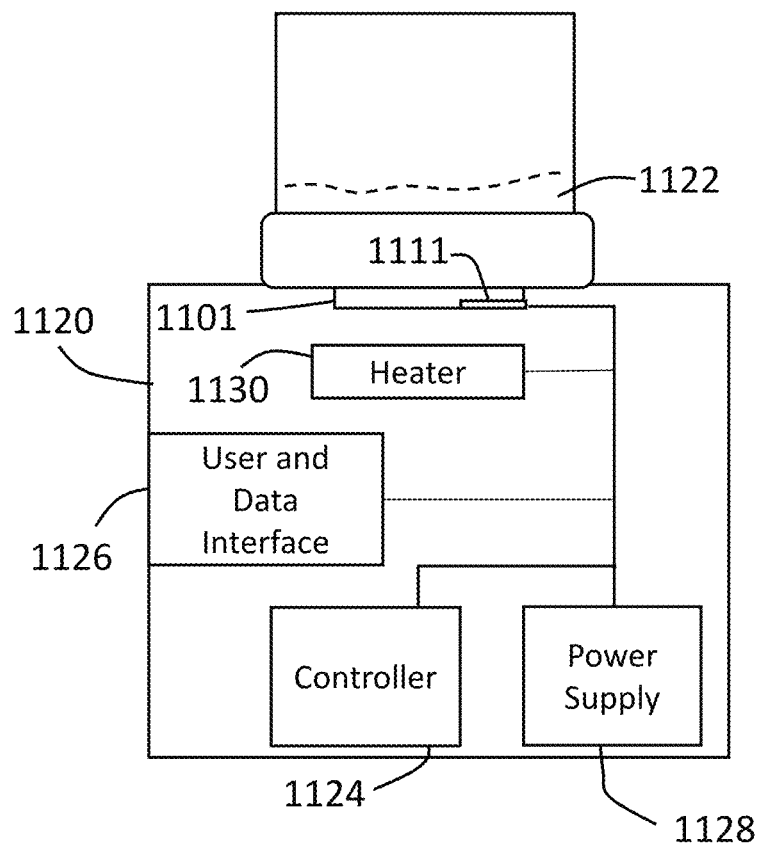

The sample container 1116 is then inverted (FIG. 12C) and placed on the sensing system 1120 (FIG. 12D). The sensing system 1120 is configured in the same manner as sensing system 300 and includes a controller 1124, a user and data interface 1126, a power supply 1128 and a heater 1130. The sensor assembly 1101 connects to the system 1120 via the terminals 1111. It should be appreciated that when the sample container 1116 is inverted, the mixture 1122 flows into the cover 1114 under the influence of gravity. This allows a portion of the mixture 1122 to flow through the openings 1104 and into contact with the matrix members 1108.

Figure 13:
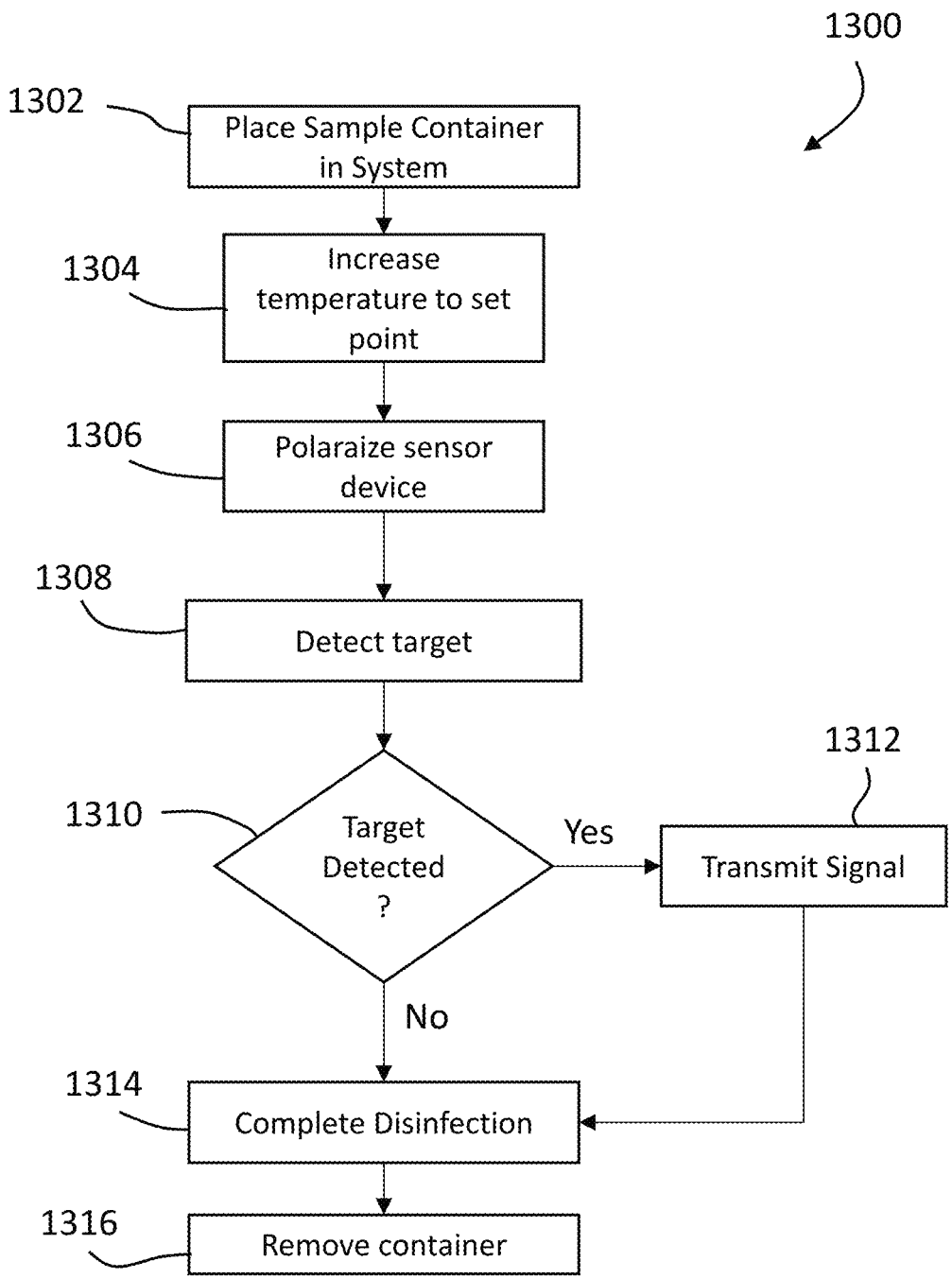
FIG. 13 is flow diagram of a method for operating the self-disinfecting sensing system of FIG. 12D.

Referring now to FIG. 13, an embodiment is shown of a method 1300 for operating the sensing system 1120. The method 1300 begins in block 1302 where the sample 1122 is prepared in the sample container 1116 as described herein above, and then placed in the sensing system 1120. The heater 1130 is activated 1304 to increase the temperature of the sample 1122 to a predetermined temperature, such as 59 C for example. Once the temperature reaches the desired set point, the test begins with the power supply 1128 providing electrical power to the sensor assembly 1101 via the terminals 1111. This polarizes the sensing devices 1306 and allows for the detecting of the target life-form. The method then proceeds to block 1308 where conditions are provided to detect the target life-form.

Query block 1310 returns a positive when the target life-form is detected and a signal is transmitted 1312 from the sensing device to the controller 1124. The method 1300 then proceeds to block 1314 where the combination of temperature and polarization result in a disinfection of the sensor devices (i.e. the matrix member 1108). The sample container 1116 is removed from the sensing system 1120 in block 1316.

The term "about" is intended to include the degree of error associated with measurement of the particular quantity based upon the equipment available at the time of filing the application. For example, "about" can include a range of ±8% or 5%, or 2% of a given value.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection." It should also be noted that the terms "first", "second", "third", "upper", "lower", and the like may be used herein to modify various elements. These modifiers do not imply a spatial, sequential, or hierarchical order to the modified elements unless specifically stated.

The broad descriptor 'life form' (plural 'life forms') includes without limitations wild, native, or mutated genetic material either spontaneously or artificially arising from an intentional or unintentional manipulation of organisms and/or their parts as well as target life-forms and their combinations.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A life-form sensor comprising:
a matrix member made from a composite material, the composite material including needle-like particles, electrically conductive platelets and a spacer material;
a pair of electrodes electrically coupled to opposing ends of the matrix member;
a heating device in thermal communication with the matrix member; and
a controller operably coupled to the sensing device, the heating device, and the electrode, the controller being configured to receive a signal from the pair of electrodes and to polarize the matrix member and activate the heating device to a predetermined temperature range in response to placing a sample in the specimen container to simultaneously detect the presence of a target life-form and to disinfect the matrix member.

2. The life-form sensor of claim 1, wherein the needle-like particles are electrically conductive.

3. The life-form sensor of claim 2, wherein the needle-like particles are carbon nanotubes.

4. The life-form sensor of claim 3, wherein the carbon nanotubes comprise 6 to 12 walls.

5. The life-form sensor of claim 1, wherein the electrically conductive platelets configured to provide a percolation pathway between the needle-like particles and the pair of electrodes.

6. The life-form sensor of claim 5, wherein the electrically conductive platelets are selected from a group comprising: nanographite platelets, nanographite-like platelets of plain or composite semiconductive materials, metalized glasses and metallized polymeric materials with platelet-like form factors.

7. The life-form sensor of claim 1, wherein the predetermined temperature range is between 55 C and 75 C.

8. The life-form sensor of claim 7, wherein the predetermined temperature range is between 58 C and 68 C.

9. The life-form sensor of claim 1, wherein the polarizing of the matrix member includes applying a 1V to 5V potential differential.

10. The life-form sensor of claim 9, wherein the polarizing of the matrix member includes applying a 2V to 3V potential drop.

11. The life-form sensor of claim 1, further comprising a support layer coupled to a side of the matrix member.

12. The life-form sensor of claim 1, wherein the spacer material has a porosity of up to about 30 microns.

13. The life-form sensor of claim 12, wherein the spacer material is made from a material selected from a group comprising: paper, woven fabric, knit fabric, non-woven fabric, and an open pore sponge.

14. A method of detecting and disinfecting a target life-form on a sensor, the method comprising:
placing a sample material in a sample container, the sample container including a matrix member made from a composite material that includes needle-like particles, electrically conductive platelets and a spacer material;
perforating a cellular membrane of at least a portion of the sample material;
heating the sample material to a predetermined temperature range;
polarizing the sample material;
determining the presence of a predetermined target life-forms in response to the heating and polarizing of the sample material; and
disinfecting the matrix member based at least in part on the heating and polarizing of the sample material.

15. The method of claim 14, further comprising heating a temperature of the sample material to a predetermined set point prior to polarizing the matrix member.

16. The method of claim 14, further comprising mixing a sample material with pure water in the sample container.

17. The method of claim 14, wherein the electrical conductive platelets provide a percolation pathway between the needle-like particles and the pair of electrodes.

18. The method of claim 14, wherein the predetermined temperature range is between 55 C and 75 C.

19. The method of claim 18, wherein the predetermined temperature range is between 58 C and 68 C.

20. The method of claim 14, wherein the polarizing of the matrix member includes applying a 1V to 5V potential differential.

* * * * *